May 30, 1944.　　　　C. S. KNIGHT　　　　2,350,238
MACHINE FOR TRIMMING THE FLASH FROM RUBBER HEELS AND THE LIKE
Filed July 25, 1942　　　　4 Sheets-Sheet 1

Inventor:
Chesterton S. Knight,
by J. H. McCready,
Attorney.

May 30, 1944.   C. S. KNIGHT   2,350,238
MACHINE FOR TRIMMING THE FLASH FROM RUBBER HEELS AND THE LIKE
Filed July 25, 1942   4 Sheets-Sheet 2

Inventor:
Chesterton S. Knight,
by J. H. McCready
Attorney

May 30, 1944.  C. S. KNIGHT  2,350,238
MACHINE FOR TRIMMING THE FLASH FROM RUBBER HEELS AND THE LIKE
Filed July 25, 1942  4 Sheets-Sheet 4
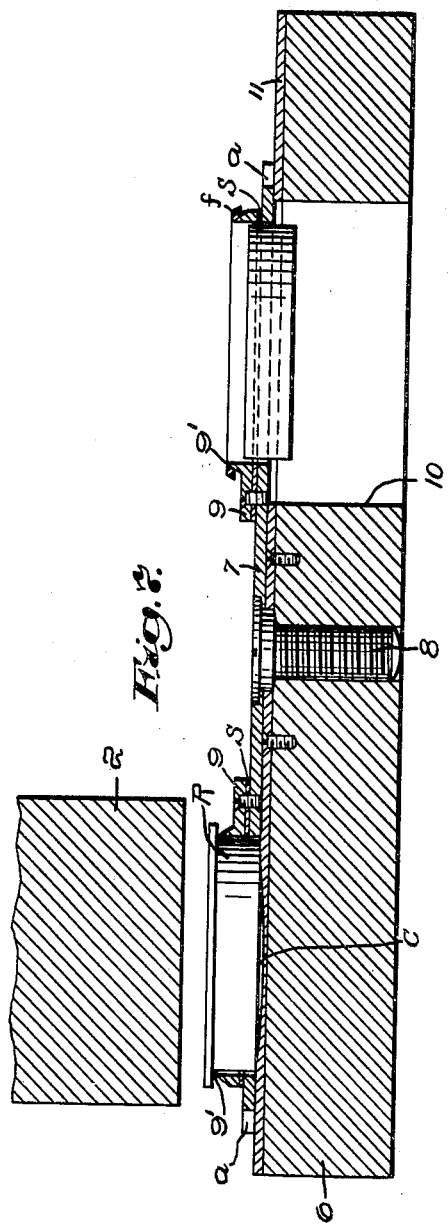
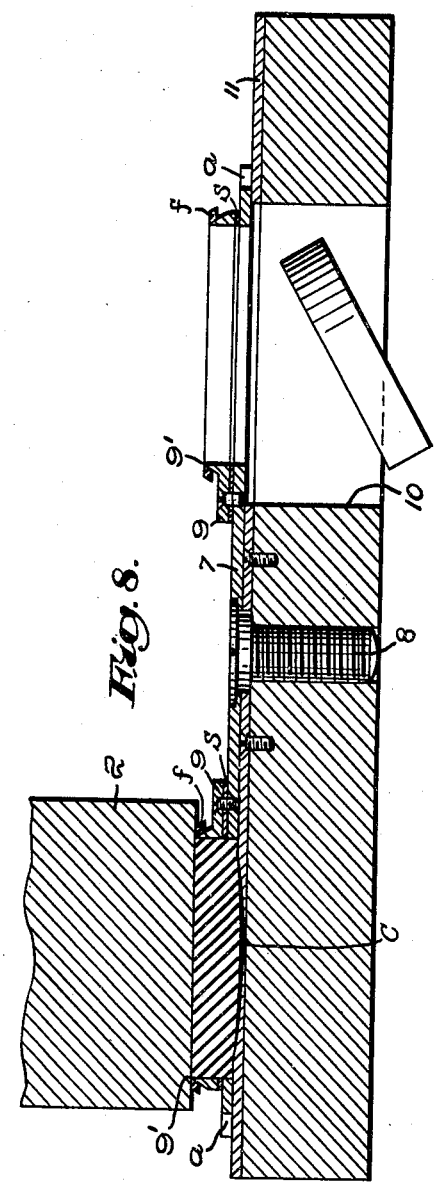
Inventor:
Chesterton S. Knight,
by J. H. McCrady,
Attorney.

Patented May 30, 1944

2,350,238

UNITED STATES PATENT OFFICE 2,350,238

MACHINE FOR TRIMMING THE FLASH FROM RUBBER HEELS AND THE LIKE

Chesterton S. Knight, Brockton, Mass., assignor to Geo. Knight & Co., Brockton, Mass., a copartnership Application July 25, 1942, Serial No. 452,314

16 Claims. (Cl. 164—20)

When a rubber heel is removed from the mold cavity in which it has been shaped and vulcanized, it practically always has a fin or flange of rubber projecting laterally from its upper edge and extending more or less completely around the heel. This flange (commonly referred to as "flash") is produced by the fact that some excess stock always is introduced in the mold in order to be absolutely sure that the cavity will be completely filled. While care is taken to reduce this surplus, so far as possible, nevertheless some overflow usually occurs and produces the flash above referred to. This surplus material must be trimmed off before the heels are sold, and this operation usually has been performed by feeding and guiding a heel by hand past a rotary knife or cutter. Naturally it increases the manufacturing expense of the product.

In a pending application Ser. No. 384,334, filed March 20, 1941 (now issued as Patent No. 2,295,090, dated September 8, 1942), I have shown, described and claimed both a method of and an apparatus for removing flash more quickly and economically than by the customary hand method. The present invention aims to devise a machine operating in accordance with the method disclosed in said application, and which will be even more efficient and will have a larger capacity than does the machine or apparatus illustrated in my application just referred to.

The nature of the invention will be readily understood from the following description when read in connection with the accompanying drawings, and the novel features will be particularly pointed out in the appended claims.

In the drawings,

Figs. 7 and 8 are sectional views through a base, feed plate and die assembly differing slightly from that shown in Figs. 1 to 4, but which ordinarily are used in place of it, these views being on a larger scale than Figs. 1 to 4.

Figure 1:
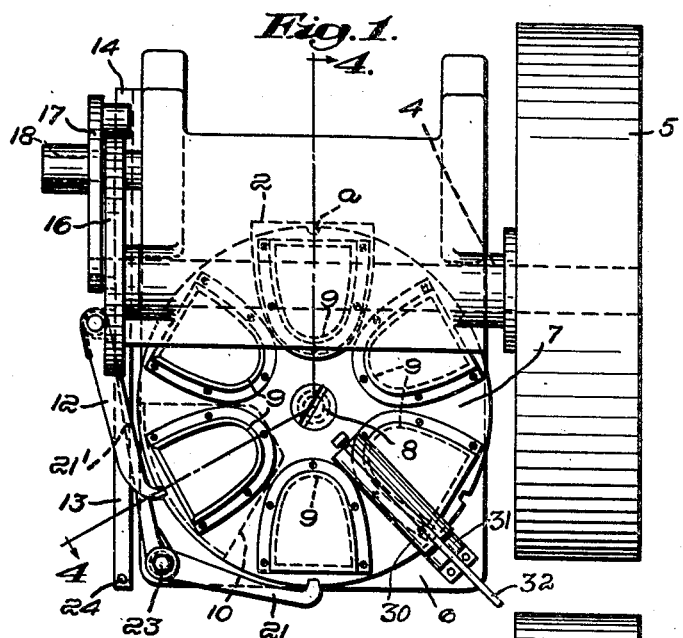
Figure 1 is a plan view of a machine constructed in accordance with the present invention.

Referring first to Figs. 1 to 4, inclusive, the machine there illustrated comprises a press similar to the perforating presses commonly used in the shoe trade. It includes a plunger or platen 2 guided for vertical reciprocating motion through a relatively short stroke and, in the particular form shown, is arranged to be driven by an eccentric 3 fast on a main shaft 4 to which a fly wheel 5 is secured. The machine also includes a stationary base plate 6 supported rigidly in the machine frame. Mounted on this base plate is a rotary feed plate 7 arranged to revolve around a central stud 8. Secured to it are several dies 9, in this instance six, each consisting of a plate-like body provided with a heel-shaped cavity or aperture extending therethrough and surrounded by a cutting edge 9, best shown in Figs. 7 and 8, projecting upwardly therefrom. While the dies may be made integral with the feed plate 7, it is usually preferable to make them independently of it and to secure them rigidly to the plate, as best shown in Figs. 7 and 8, but, in any event, the feed plate is provided with apertures of the same size and shape as, and registering with, those in the dies.

Consequently, if molded rubber heels R are placed in these cavities, as the feed plate is revolved step by step, they will be brought successively into cutting position under the platen or plunger 2, the heels riding on the surface of the base plate 6 while they are being transferred. The apertures in the dies are so related to the dimensions of the heels that the latter can be dropped into them easily and rapidly by the operator, and the heels should have sufficient clearance so that when they have been trimmed they will fall down through an aperture provided for this purpose in the base 6. Such clearance should not be too great, as will presently appear. When the plunger descends upon one of them its first engagement with the heel will expand it laterally due to the fact that the heels are somewhat thicker than the depth of the cavities. Such expansion makes the heel fill out the cavity laterally and presses its edge firmly against the inner wall surface of the cavity. As the plunger continues to descend it forces the flash down upon the cutting edge 9' and causes the latter to shear off the excess material flush with the edge surface of the heel, or so nearly flush as to be satisfactory for practical purposes.

Mechanism is provided to rotate the die plate in timed relation to the movements of the plunger so that the heels are brought successively under it, are trimmed, and are carried away from it. As the dies are brought around in position to receive other heels, they pass over a hole 10, Fig. 1, formed through the base plate 6, and consequently, the heels drop successively through this aperture and into some receptacle provided to receive them.

Usually it is preferable to secure a plate 11 to the upper surface of the base 6, as shown in Figs. 7 and 8, where it forms, in effect, a part of that base upon which the heels rest as they are being fed to and from the cutting station. This plate, however, has the advantage of being readily shaped to provide better operating conditions at the cutting point and of being readily interchangeable with other plates shaped in accordance with the requirements of different types of heels. For example, if the rubber heels being operated upon are thick and have concave upper surfaces, then a flat plate is entirely satisfactory, or no plate at all need necessarily be used. If, however, they do not have such a concave upper surface and, instead, are of substantially uniform thickness, then the flash trimming operation will be facilitated if the plate 11 is made concave at the cutting station so that the maximum pressure will be exerted on the marginal portion of the heel body. Such a concavity in the plate is shown at C in Figs. 7 and 8. The former figure illustrates a heel R in cutting position with its bottom surface resting on the upper surface of the plate 11 and the projecting flash extending over the cutting edge 9' of the die, while the latter figure shows the heel compressed at the instant of severing the flash.

Because it is important that the height of the cavities shall bear a definite relationship to the height or thickness of the heels, it is preferable to interpose one or more shims S, Figs. 7 and 8, between the dies 9 and the feed plate 7. Thus, in setting up for a given run of heels, the proper adjustment can readily be made by selecting shims of suitable thickness.

Figure 2:
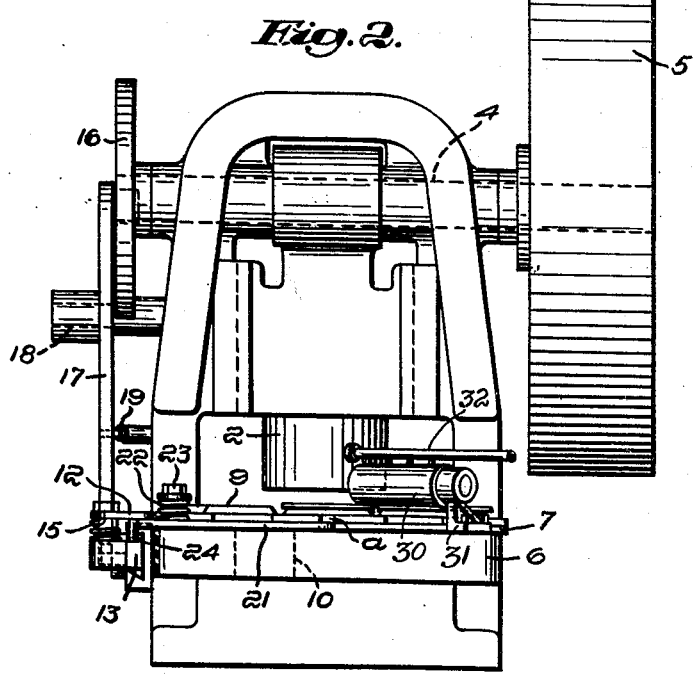
Fig. 2 is a front elevation of the machine shown in Fig. 1.
Figure 3:
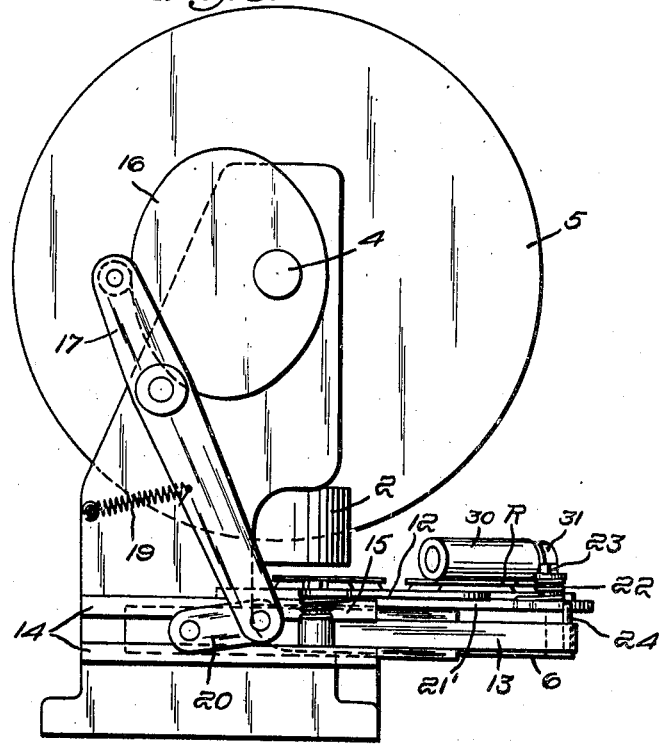
Fig. 3 is a side view of the machine illustrated in Figs. 1 and 2.
Figure 4:
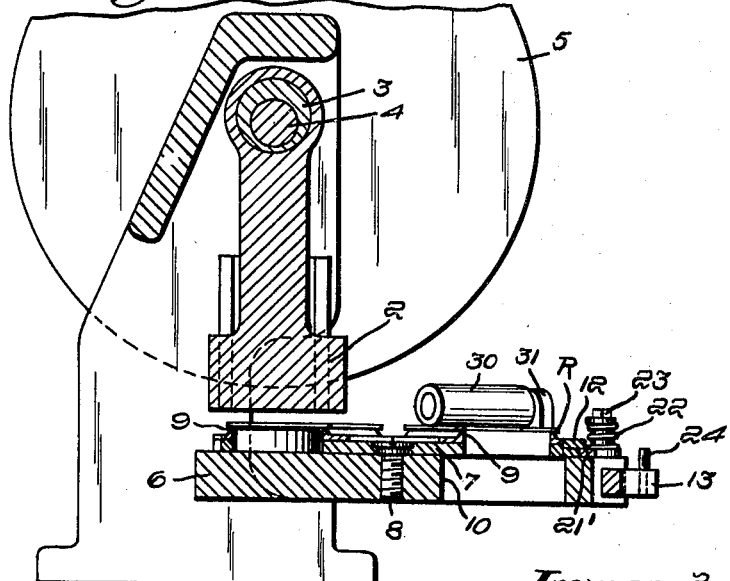
Fig. 4 is a vertical, sectional view taken approximately on the line 4—4, Fig. 1.

The mechanism for rotating the feed and die plate 7, as just described, comprising a pawl 12 pivotally supported on a dove-tail slide 13 mounted in a correspondingly shaped groove formed in ways 14, Figs. 1 and 3, secured to the frame and to the left-hand edge, Figs. 1 and 2, of the base 6. A torsion spring 15 acts on this pawl in a direction to hold its forward end or point constantly against the peripheral edge of the feed plate 7, and this edge is notched at suitable intervals, as shown at a, to receive the end of the pawl. The slide 13 is reciprocated by connections with a cam 16 secured fast on the shaft 4, these connections including a lever 17 fulcrumed at 18 and carrying a roll which runs on the periphery of the cam, the lower end of the lever being connected with the slide by a link 20. Between feeding movements of the plate 7 by this mechanism its rotation is prevented by a holding pawl 21, best shown in Fig. 1, the end of this pawl being adapted to enter the successive notches a as they come into line with it. A spring 22, coiled around the pivot 23 for this pawl, acts on it in a direction to hold it yieldingly in its plate locking position. This pawl is made in the form of a bell crank lever and has a rearwardly extending arm 21', a portion of which lies within the path of movement of a pin 24 mounted on the forward end of the slide 13. Consequently, during the retracting movement of the pawl 12, which movement is produced by the rearward motion of the slide 13, the pin engages the arm 21', and cams the lever 21 out of its locking position just before the pawl 12 arrives in its extreme rearward position and as it is about to drop into the next notch a in the edge of the feed plate 7. At this instant, therefore, the plate is free for its subsequent feeding movement produced by the slide 13 and the pawl 12. Shortly after that movement begins the pawl 21 is released by the pin 24, but the spring 22 merely serves at this time to hold the end of the latter pawl against the edge of the die plate and to force it into the next notch a when the latter arrives in position to permit such movement.

When the heel, soles, or other rubber bodies to be trimmed are very thin, it may not be possible to use such an arrangement as that above described because the distance between the surface on which the heel rests and the cutting edge of the die is too small to permit the use of elements having the necessary size to be serviceable and reliable. Conditions of this nature can be handled satisfactorily by mounting a plunger at the cutting station on which the rubber heel or sole will be supported during the cutting operation and providing mechanism for moving both the plunger and the platen toward each other simultaneously so as to squeeze the rubber body between them while the flash is forced against the cutting edge and thus is severed. If these heels or soles have a concave upper surface, then the surface of the plunger on which they rest may be flat. On the other hand, if they are flat on both top and bottom, then better results are obtained by supporting them on a concave surface, somewhat as shown in Figs. 7 and 8.

Figure 5:
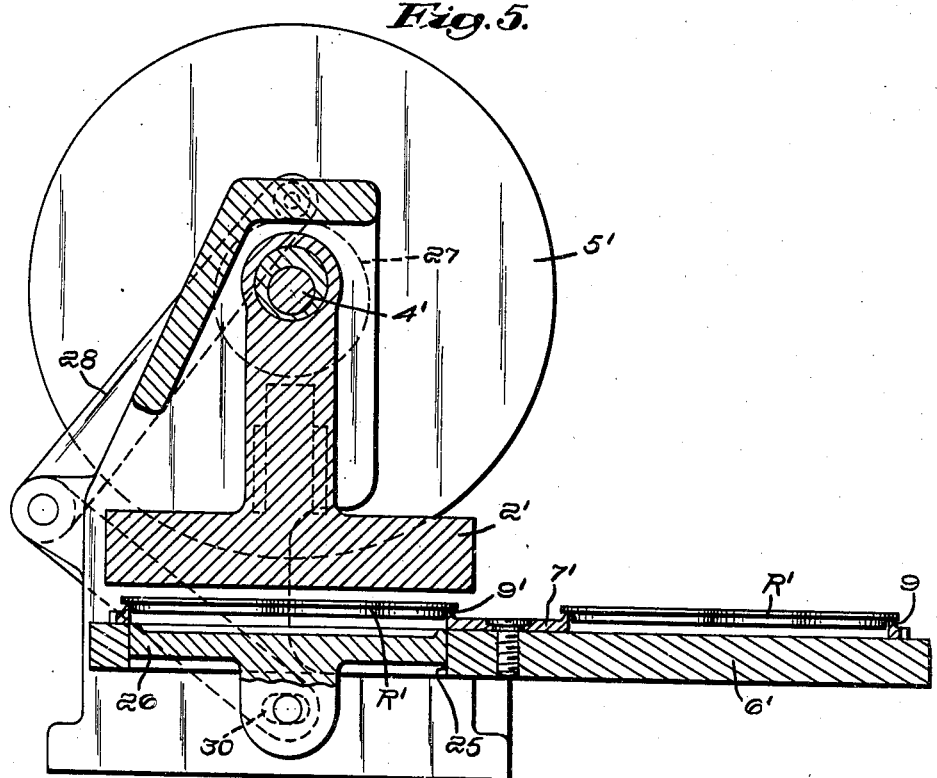
Figs. 5 and 6 are views much like Fig. 4 showing a modification.
Figure 6:
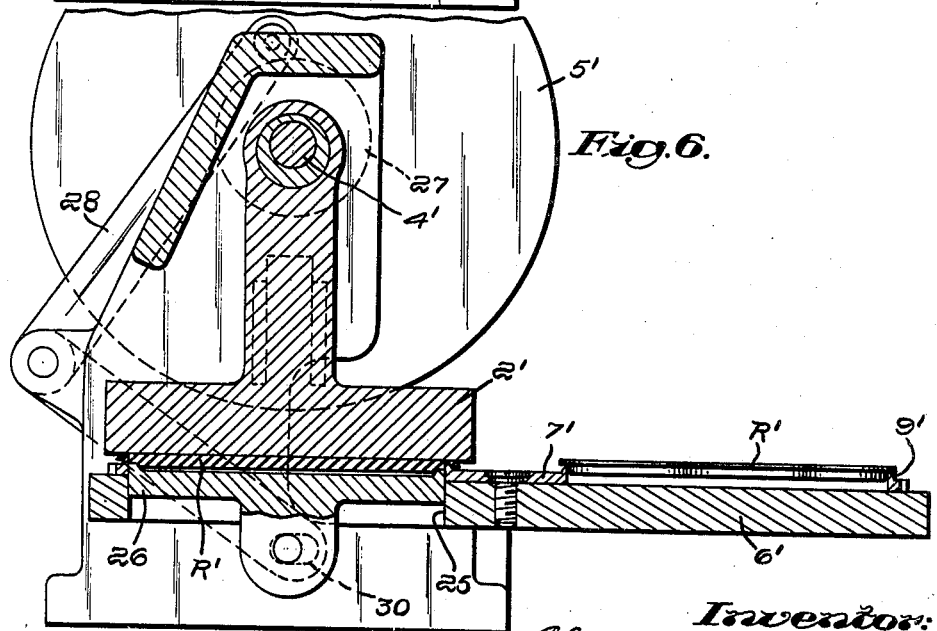

Such an arrangement is illustrated in Figs. 5 and 6 in which the parts corresponding to those shown in the earlier figures are designated by the same, but primed, numerals. There the base plate 6' is apertured, as shown at 25, to receive a plunger 26 adapted to fit snugly into each cavity in the feed plate 7' as it is brought into its cutting position under the platen. Also, an additional cam on eccentric 27 is secured on the main shaft 4' and it operates through a bell crank lever 28 and a pin and slot connection 30 with the plunger to raise this plunger simultaneously and in synchronism with the downward movement of the platen 2'. As illustrated in these figures, the central portion of the upper area of the plunger is cut away so that the vertical squeezing pressure so applied to the rubber body R', Figs. 5 and 6, is exerted only on the marginal portions of this body. It does, however, expand that body sufficiently to make its edges bear firmly against the confining walls of the cavity so that as the platen completes its downward movement it severs the flash close to the edge surfaces of said body. In Figs. 5 and 6 the dies are shown integral with the feed plate 7', but the dies in this construction may be made individually and secured to the feed plate, as shown in Figs. 7 and 8, with interposed shims as in the machine previously described. As above indicated, if the heels have concave upper surfaces then the upper surface of the plunger 26 may be left flat.

In using either of these machines the operator sits in front of it and places a heel or sole, as the case may be, into each cavity as it is brought into the receiving position or station, the speed of the machine being so adjusted that this operation may readily be performed. The operator has nothing more to do except to take off the flash left by a preceding trimming operation as each cavity approaches the receiving or loading station. The remaining operations are entirely automatic. Thus the flash trimming operation is performed far more rapidly than can be done by hand and with a degree of uniformity which is difficult to duplicate manually.

During the operation of either of these machines, there is a slight slip of portions of the upper surface of the heel under the platen or plunger at the cutting station as the platen compresses the heel. This slip occurs in radial directions as the heel expands laterally under compression. In order to facilitate this relative movement of the meeting surfaces of the platen and the heel a lubricant of some kind should be introduced between them. As is well known, water is a good lubricant for rubber and a convenient way of providing such lubrication consists in mounting a roll 30, Figs. 1 to 4, where it will be revolved idly by the passage of each heel as the latter travels from the loading station to the cutting station. As shown, the roll is supported on a stationary shaft mounted in a bracket 31 secured to the machine frame, and water is supplied to it by a drip pipe 32 provided with a few apertures on its lower side through which water is allowed to drip slowly on to the surface of the roll. This surface should be covered with rubber, felt, or some other suitable material which will transfer the water to the upper surface of each heel as the latter passes under the roll and in contact with it on its way to the cutting station.

While I have herein shown and described preferred embodiments of my invention, it will be evident that this invention is not limited to embodiment in the particular forms illustrated. It will also be understood that since these machines are adapted to operate on heels, soles and other rubber bodies which can be trimmed in a similar manner, the term "rubber heel" as herein used is intended to include such other bodies.

Having thus described my invention, what I desire to claim as new is:

1. In a machine for trimming the flash from molded rubber heels, the combination with a rotary feed plate having a series of cavities therein each shaped to receive a heel loosely, each of said cavities being closely surrounded by a cutting edge over which the flash on the heel in the cavity projects, a base plate on which said feed plate is mounted for rotation, a platen movable toward and from said base plate, means for reciprocating said platen, and mechanism for rotating said feed plate to carry the heels positioned in said cavities successively through the path of movement of said platen, whereby the platen will compress and laterally expand the heels successively in said cavities and will simultaneously trim off the flash against said cutting edges, said feed plate being movable over an area in which the base plate does not form a bottom for said cavities, whereby the heels will drop out of the cavities as they are brought successively over said area after the flash trimming operation has been performed on them.

2. In a machine for cutting the flash from the edges of rubber heels, the combination of a feed plate having a circular series of dies therein, each including a cavity to receive a heel loosely and each cavity being closely surrounded by a cutting edge over which the flash on the respective heels in said cavities projects, a platen, mechanism for reciprocating said platen in a direction transverse to the plane of said plate, means for supporting said plate for rotation to carry the heels in said cavities successively through the path of travel of said platen, means for rotating said plate step by step in timed relationship to the stroke of said platen to present the heels in said cavities successively to the operation of the platen, and means for supporting said heels while they are in operative relationship to the platen to cause the latter to expand the heels laterally into contact with the walls of said cavities while the flash projects over the cutting edges of the respective cavities so that it will be forced against said cutting edges and cut off by the motion of the platen.

3. In a machine according to preceding claim 2, a construction in which said feed plate is supported horizontally and said means for supporting the heels includes a power driven plunger cooperating with said platen to squeeze the heels vertically while the platen forces the flash against the cutting edges.

4. In a machine according to preceding claim 2, a construction in which the means for supporting said feed plate includes a horizontal base plate on which the heels rest while in position for the flash cutting operation by said plunger, said base plate having a discharge opening therein through which the trimmed heels drop as they are successively brought into register with it after they have passed the cutting position.

5. In a machine according to preceding claim 2, a construction in which said means for rotating said feed plate comprises a pawl and ratchet, in combination with means for holding said plate in a stationary position while each cavity is in cooperative relationship to said platen.

6. In a machine according to preceding claim 2, a construction in which the operating means for said feed plate comprises a spring-actuated pawl normally serving to hold the plate against rotation, a second pawl for giving said plate its intermittent rotative movements, and mechanism for operating the latter pawl and serving also to release said holding pawl immediately prior to and during the feeding movement of the second pawl.

7. In a machine according to preceding claim 2, a construction in which the mechanism for reciprocating said platen comprises a shaft for driving the same, and the means for rotating said plate includes a cam fast on said shaft and a pawl and ratchet mechanism driven by said cam which imparts rotative movements to said feed plate.

8. In a machine according to preceding claim 2, a construction in which the means for supporting said feed plate includes a base plate on which said feed plate is mounted for rotation in a horizontal plane, said base plate having an aperture therethrough registering with the respective cavities while they are in cutting position under said platen, in combination with a plunger mounted to reciprocate in said aperture and so shaped as to fit in each cavity as it is brought into cutting position, and mechanism for moving said plunger upwardly into each cavity while in cutting position to squeeze the heel vertically against the platen as the latter moves downwardly and forces the flash against the cutting edge associated with the cavity.

9. A machine according to preceding claim 2, including means for applying lubricating material to the surfaces of said heels that contact said platen.

10. A machine according to preceding claim 2, including means for applying lubricating material to the surfaces of said heels to be engaged by said platen but making said application prior to such engagement.

11. A machine according to preceding claim 2, including means for applying lubricant to the surfaces of said heels to be engaged by the platen, said means including a roll mounted in position to make such application as the heels travel to the flash trimming position.

12. A machine according to preceding claim 2, including a roll mounted in position to be engaged and revolved by successive heels as they are moved toward the flash trimming position, and means for supplying lubricant to said roll where it will transfer such lubricant to the surfaces of the heels to be engaged by the platen.

13. A machine according to preceding claim 2, in which said cutting edges are formed on cutting dies, each secured to said feed plate and each having an aperture of the same shape and size as the respective apertures in the feed plate and each respectively registering with one of said apertures.

14. A machine according to preceding claim 2, in which said cutting edges are formed on cutting dies each secured to said feed plate and each having an aperture of the same shape and size as the respective apertures in the feed plate and each respectively registering with one of said apertures, and removable shims positioned between said dies and said feed plate whereby the height of the cavities can be adjusted by using shims of suitable thicknesses.

15. A machine according to preceding claim 1, in which said base plate includes a removable top plate section having a surface portion for supporting successive heels at the flash trimming position, said surface portion being shaped to cooperate with the platen in applying greater pressure to the margins of the heels than to the central portions thereof.

16. A machine according to preceding claim 1, in which said base plate includes a removable top plate on which said heels rest while they are being fed by said feed plate, said top plate having a portion thereof supporting successive heels in the flash trimming position and said portion having marginal surfaces higher than the central portion thereof.

CHESTERTON S. KNIGHT.